(No Model.)
S. W. LEE.
GATE.
No. 358,462. Patented Mar. 1, 1887.
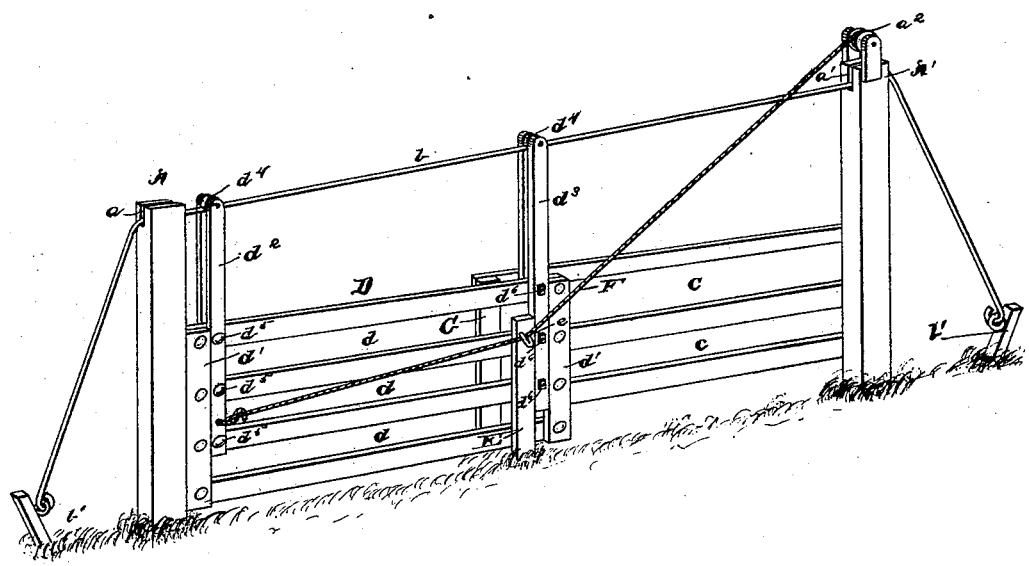
Witnesses
Geo. Thorpe
John H. Diggers
S. W. Lee, Inventor
By his Attorneys
C. A. Snow & Co.

UNITED STATES PATENT OFFICE.

SAMUEL W. LEE, OF ATHENS, PENNSYLVANIA.

GATE.

SPECIFICATION forming part of Letters Patent No. 358,462, dated March 1, 1887.

Application filed August 16, 1886. Serial No. 211,034. (No model.)

*To all whom it may concern:*

Be it known that I, SAMUEL W. LEE, a citizen of the United States, residing at Athens, in the county of Bradford and State of Pennsylvania, have invented a new and useful Improvement in Gates, of which the following is a specification.

My invention relates to sliding gates, doors, &c.; and the object of my invention is to produce a gate which may be opened both by persons on horseback and in vehicles, and one which shall close automatically when released from its open position.

To the above purpose my invention consists in certain peculiar and novel features of construction and arrangement, as hereinafter described and claimed.

In order that my invention may be fully understood, I will proceed to describe it with reference to the accompanying drawing, which is a side elevation of my improved gate.

In the said drawing, A A' designate two upright posts, which are connected together by a wire, $b$, the ends of which are anchored to stakes $b'$, set obliquely in the ground beyond said posts A A'. This wire passes through slots $a\ a'$ in the upper ends of posts A A', respectively, and the post A being shorter than the post A', that portion of the wire $b$ which runs between said posts inclines downward toward the post A, against which the gate closes. Horizontal bars $c$ extend from post A' to a short post, C, which is driven vertically into the ground midway between the posts A A', so that when the gate is closed no open space shall be left between the rear end of the gate and the post A'.

D designates the gate-frame, which consists of the horizontal bars $d$, connected together at their ends by vertical bars $d'$, four of said horizontal bars being shown. This gate-frame is suspended from the wire $b$ by two upright bars, $d^2\ d^3$, which carry at their upper ends grooved pulleys $d^4$, arranged to travel upon the said wire $b$, the bar $d^2$ being shorter than the bar $d^3$. These bars $d^2\ d^3$ are attached to the bars $d$ by bolts $d^5$ and nuts $d^6$, and, as shown in the drawing, the lower ends of bars $d^2\ d^3$ extend downward only as far as the third bar $d$. In snowy or other inclement weather the bolts $d^5$ may be removed and the gate lifted up, so that the lower ends of the bars $d^2\ d^3$ shall be attached to the lower bar $d$ of the gate-frame, in order that the gate may properly clear snow-drifts or other obstructions.

E designates a short post, which is set vertically about midway between the posts A A', and upon the outer side of which is placed a staple or loop, $e$, said loop being near the upper end of the post, as shown. A cord, F, is attached at one end to the lower end of bar $d^2$ and extends through the loop $e$ and thence upward over a pulley, $a^2$, upon post A', from which pulley the cord depends into convenient reach of the operator. Thus it will be seen that the gate may be readily pulled open by the operator without descending from his team, and that as soon as the cord F is released the gate will roll toward the post A and close automatically by force of gravity.

The gate is cheap and light in construction, and is at the same time strong and durable, the wire $b$ rendering the use of heavy posts unnecessary. This gate may be used either as a farm or other gate, and its construction may be applied to barn-doors, &c.

I am aware of Patent No. 105,067 for swinging gates, which comprises a swinging crane hinged at one end to one of the gate-posts and adjustably connected to the gate, so that the latter is supported at any desired elevation above the ground and is free to swing horizontally, so that it will clear snow-drifts, &c. This crane and the gate carried thereby is counterbalanced by means of a weighted rope which passes over vertical pulleys which are suitably journaled in place. My invention differs from this device in that I dispense with the hinged swinging crane and the various devices for counterbalancing the same and the gate thereon, thereby producing a cheaper and simpler gate. In my improved gate the gate proper is suspended by means of vertical arms from an inclined track, and the said vertical suspending arms are adjustably connected by means of through-bolts and nuts to the horizontal bars of the gate and within the end vertical stiles thereof, thereby permitting the gate to be elevated at different heights from the ground and to slide freely back and forth on the track thereof.

I am also aware that it is not new to provide a sliding gate with an inclined track which is formed by a bar of wood or rod of iron, and to make the suspending-bars of unequal heights. I attach especial importance to the vertical suspending-bars carrying the rollers at their upper ends and adjustably connected at their lower ends to the horizontal bars of the gate within the end vertical stiles thereof.

Having thus described my invention, what I claim as new, and desire to secure by Letters Patent, is—

The herein-described sliding gate, comprising the vertical end bars, $d'$, the horizontal bars $d$, secured at their ends to the said vertical bars, and the vertical suspending-bars $d^2\ d^3$, arranged adjacent to the end bars, $d'$, and adjustably connected at their lower ends to the horizontal bars by through-bolts and nuts, whereby the gate can be lowered or elevated on the said suspending-bars, the suspending-bars being of different heights and each having a supporting-roller journaled in its upper end, in combination with the vertical gate-posts, the inclined rod or track supported in the posts and having the rollers of the gate traveling thereon, the vertical post E, arranged out of the path of the gate and having the guide-loop and the operating-cord connected to the sliding gate and passing through the guide-loop on the post E, whereby the gate is opened by the operating-cord and automatically closes against one of the gate-posts when the pull on the cord is released, substantially as described, for the purpose set forth.

In testimony that I claim the foregoing as my own I have hereto affixed my signature in presence of two witnesses.

SAMUEL W. LEE.

Witnesses:
N. C. HARRIS,
C. A. SAWTELLE.